(12) United States Patent
Lee

(10) Patent No.: US 12,082,590 B1
(45) Date of Patent: Sep. 10, 2024

(54) METHOD AND APPARATUS FOR PORTIONING AND STORING A MEAT CHUB

(71) Applicant: Perry Lee, Live Oak, TX (US)

(72) Inventor: Perry Lee, Live Oak, TX (US)

( * ) Notice: Subject to any disclaimer, the term of this patent is extended or adjusted under 35 U.S.C. 154(b) by 303 days.

(21) Appl. No.: 17/550,072

(22) Filed: Dec. 14, 2021

Related U.S. Application Data

(60) Provisional application No. 63/127,037, filed on Dec. 17, 2020.

(51) Int. Cl.
| | | |
|---|---|---|
| *A22C 17/00* | (2006.01) | |
| *A23B 4/06* | (2006.01) | |
| *B65B 25/06* | (2006.01) | |
| *B65B 25/08* | (2006.01) | |
| *B65D 51/24* | (2006.01) | |

(52) U.S. Cl.
CPC .......... *A22C 17/0033* (2013.01); *A23B 4/068* (2013.01); *B65B 25/065* (2013.01); *B65B 25/08* (2013.01); *B65D 51/24* (2013.01); *A23V 2002/00* (2013.01)

(58) Field of Classification Search
CPC ... A22C 17/0033; A23B 4/068; B65B 25/065; B65B 25/08; B65D 51/24; B26D 3/24; B26D 3/283; B26D 1/553
USPC ............................................. 83/13, 607, 635
See application file for complete search history.

(56) References Cited

U.S. PATENT DOCUMENTS

| | | | | |
|---|---|---|---|---|
| 4,299,148 A | * | 11/1981 | Meier | B26D 3/24 |
| | | | | 33/525 |
| 9,545,112 B1 | * | 1/2017 | Strauss | B26D 3/24 |
| 2006/0182861 A1 | * | 8/2006 | Arend | B26D 3/08 |
| | | | | 426/518 |
| 2015/0375411 A1 | * | 12/2015 | Parr | B26D 3/24 |
| | | | | 83/13 |

* cited by examiner

*Primary Examiner* — Nhat Chieu Q Do
(74) *Attorney, Agent, or Firm* — Taboada Law Firm, PLLC; John M. Taboada

(57) ABSTRACT

Methods and apparatuses for portioning and storing a meat chub are disclosed, including providing an apparatus comprising: a housing having an opening; a lid removably coupled to the opening of the housing, the lid comprising a plurality of slotted openings; and one or more cutters removably insertable through the plurality of slotted openings; wherein the housing is configured to receive a meat chub through the opening and retain the meat chub within the housing, wherein the lid is configured to secure the meat within the housing when the lid is coupled to the housing, and wherein when the lid is coupled to the housing, the one or more cutters are configured to pass through the plurality of slotted openings to cut through the meat chub retained in the housing.

6 Claims, 6 Drawing Sheets

Provide an apparatus for portioning and storing a meat chub comprising a housing having an opening configured to receive and retain a meat chub within the housing; a lid to hold and seal the meat within the housing, the lid having a plurality of slotted openings, wherein the slotted openings are configured to pass a portion of one or more cutters; wherein when the lid is attached to the housing, the one or more cutters are configured to cut through the non-frozen meat chub retained in the housing. The apparatus may further comprise a cover configured to cover and hold the one or more cutters which pass through the plurality of slotted openings and slice through the retained meat chub.
605

↓

With the lid removed from the housing, pass a non-frozen meat chub through the opening and place into the housing.
610

↓

Attach the lid to the housing.
615

↓

Pass one or more cutters through the plurality of slotted openings to slice the meat chub into desired portions. In some embodiments, a separating paper such as wax paper may be placed around the cutter, either prior to the initial cutting of the meat chub or after the initial cutting, in order to prevent the sliced portions of the meat chub from freezing back together or to the cutter. If paper is inserted, the cutter may be removed from the apparatus prior to the placement of the apparatus into the freezer. In an alternate embodiment, a cutter is used to slice through the chub and a paper insertion member is used to insert a separating paper through the slotted openings and between a previously sliced portion of the meat chub. In some embodiments, one or more paper insertion members are left in the apparatus during freezing of the meat chub.
620

↓

Remove the apparatus from the freezer when a portion or all of the meat chub is to be cooked. Since the meat chub was portioned prior to freezing, it is possible to remove only a portion of the meat chub for cooking.
625

*Fig. 6*

METHOD AND APPARATUS FOR PORTIONING AND STORING A MEAT CHUB

I. CROSS REFERENCE TO RELATED APPLICATIONS

This application claims the benefit of the filing date of U.S. Provisional Patent Application Ser. No. 63/127,037, filed on Dec. 17, 2020, entitled "Method and Apparatus for Portioning and Storing a Meat Chub," the entire disclosure of which is hereby incorporated by reference into the present disclosure.

II. BACKGROUND

The present invention pertains to portioning and storing a meat chub. More particularly, the invention relates to a method and apparatus for portioning a chub of meat into individual patties prior to its storing in a freezer. The portioning of the chub into patties makes it possible to easily select the desired amount of meat and in the correct individual quantities to be cooked. If only a portion of the chub is to be cooked, the remaining chub, with the already portioned patties, may be frozen for cooking at a later time.

III. SUMMARY

In one respect, disclosed is an apparatus for portioning and storing a meat chub comprising: a housing having an opening; a lid removably coupled to the opening of the housing, the lid comprising a plurality of slotted openings; and one or more cutters removably insertable through the plurality of slotted openings; wherein the housing is configured to receive a meat chub through the opening and retain the meat chub within the housing, wherein the lid is configured to secure the meat within the housing when the lid is coupled to the housing, and wherein when the lid is coupled to the housing, the one or more cutters are configured to pass through the plurality of slotted openings to cut through the meat chub retained in the housing.

In another respect, disclosed is a method for portioning and storing a meat chub, comprising: providing an apparatus comprising: a housing having an opening; a lid removably coupled to the opening of the housing, the lid comprising a plurality of slotted openings; and one or more cutters removably insertable through the plurality of slotted openings; wherein the housing is configured to receive a meat chub through the opening and retain the meat chub within the housing, wherein the lid is configured to secure the meat within the housing when the lid is coupled to the housing, and wherein when the lid is coupled to the housing, the one or more cutters are configured to pass through the plurality of slotted openings to cut through the meat chub retained in the housing; with the lid removed from the housing, inserting the meat chub through the opening of the housing; attaching the lid to the housing; and passing the one or more cutters through the plurality of slotted openings to slice the meat chub into portions.

Numerous additional embodiments are also possible.

IV. BRIEF DESCRIPTION OF THE DRAWINGS

Other objects and advantages of the invention may become apparent upon reading the detailed description and upon reference to the accompanying drawings.

FIG. 6 is a flowchart illustrating a method for portioning and storing a meat chub using the apparatus illustrated in FIGS. 1-5, in accordance with some embodiments.

Figure 1:
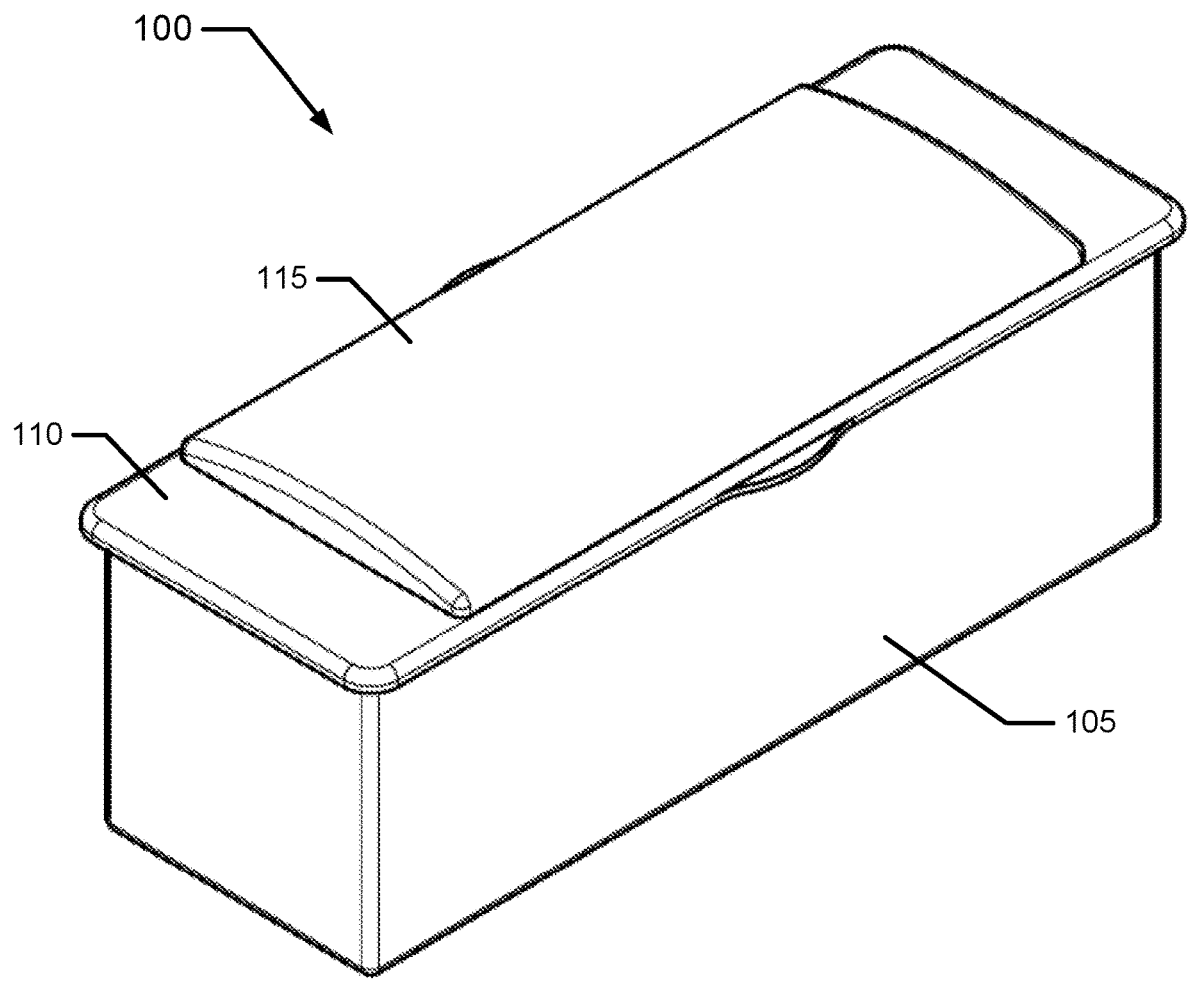
FIG. 1 is a top perspective view of an apparatus in a closed configuration for portioning and storing a meat chub, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Meat and meat products, such as ground beef, ground pork, pork sausage, and wild game for examples, are often sold to the consumer in a chub. A chub is a tube of flexible packaging material that is filled with meat and meat products by the food manufacture and sealed with metal crimps or clips at both ends. The filled chub is usually offered in certain weights of meat, such as 1 lb., 2 lbs., 3 lbs., 5 lbs., and 10 lbs. for example, and has an appearance of a sausage. The chubs may be stored in a freezer for months and brought out when the meat is going to be cooked. When the chub is removed from the freezer for thawing, all the meat in the chub is frozen together and thus not possible to easily prepare only a portion of the meat from the chub. Additionally, it is not recommended to refreeze the unused meat portion of the thawed chub and thus all the meat from the chub should be prepared when thawed. This is not such a problem with the smaller chub packages, but with the larger chub packages it may become an issue. Since larger chubs are usually sold at a discount from smaller chubs of the same meat, it is more cost effective to be able to buy the larger chub and thus a need exists for a method and apparatus for the portioning and storing of a meat chub prior to freezing. The embodiment or embodiments described herein solve these problems and others by proposing a new, safe, and simple method and apparatus to portion and store a meat chub prior to freezing.

FIG. 1 is a top perspective view of an apparatus in a closed configuration for portioning and storing a meat chub, in accordance with some embodiments.

Figure 2:
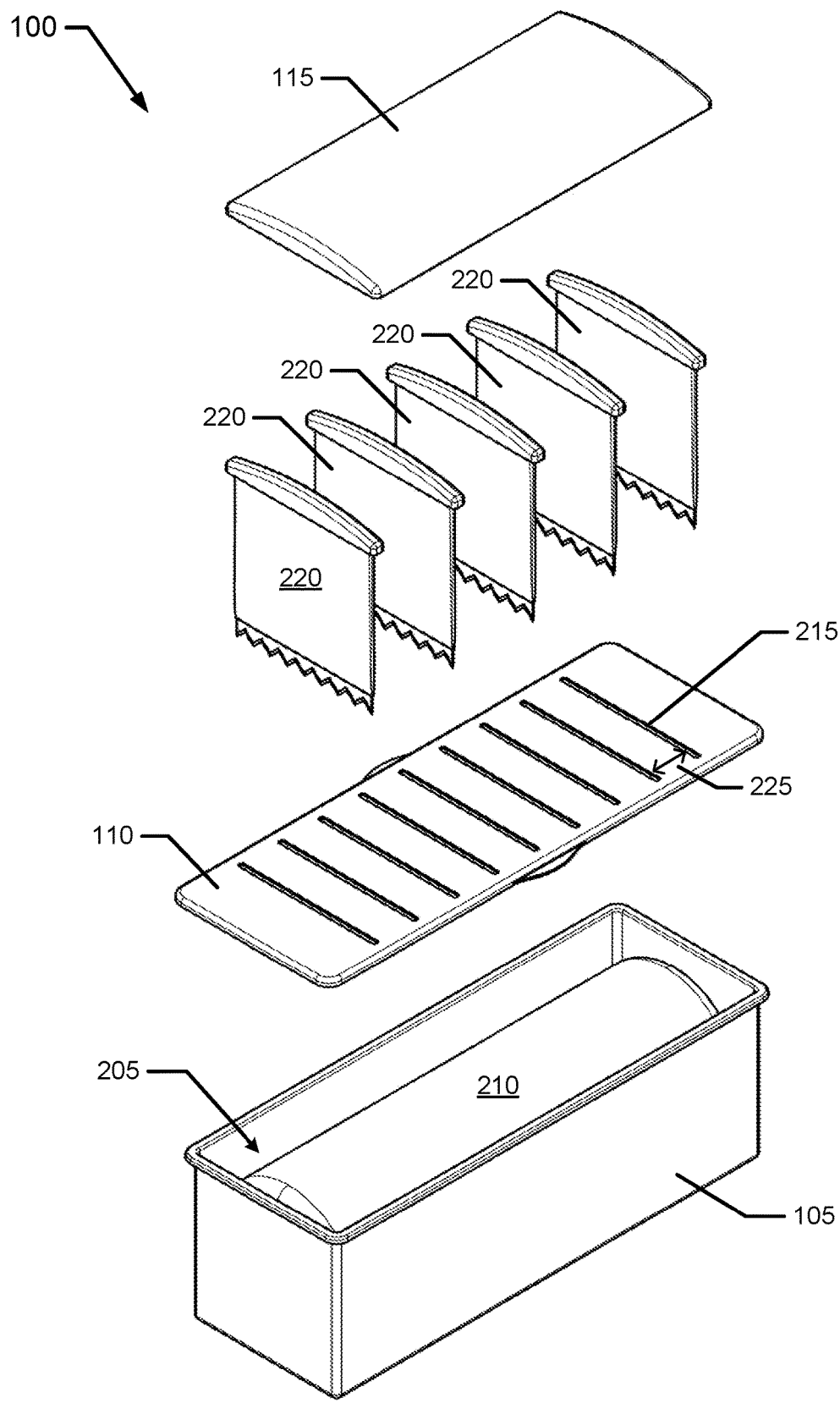
FIG. 2 is an exploded top perspective view of the apparatus illustrated in FIG. 1 holding a meat chub, in accordance with some embodiments.

FIG. 2 is an exploded top perspective view of the apparatus illustrated in FIG. 1 holding a meat chub, in accordance with some embodiments.

Figure 3:
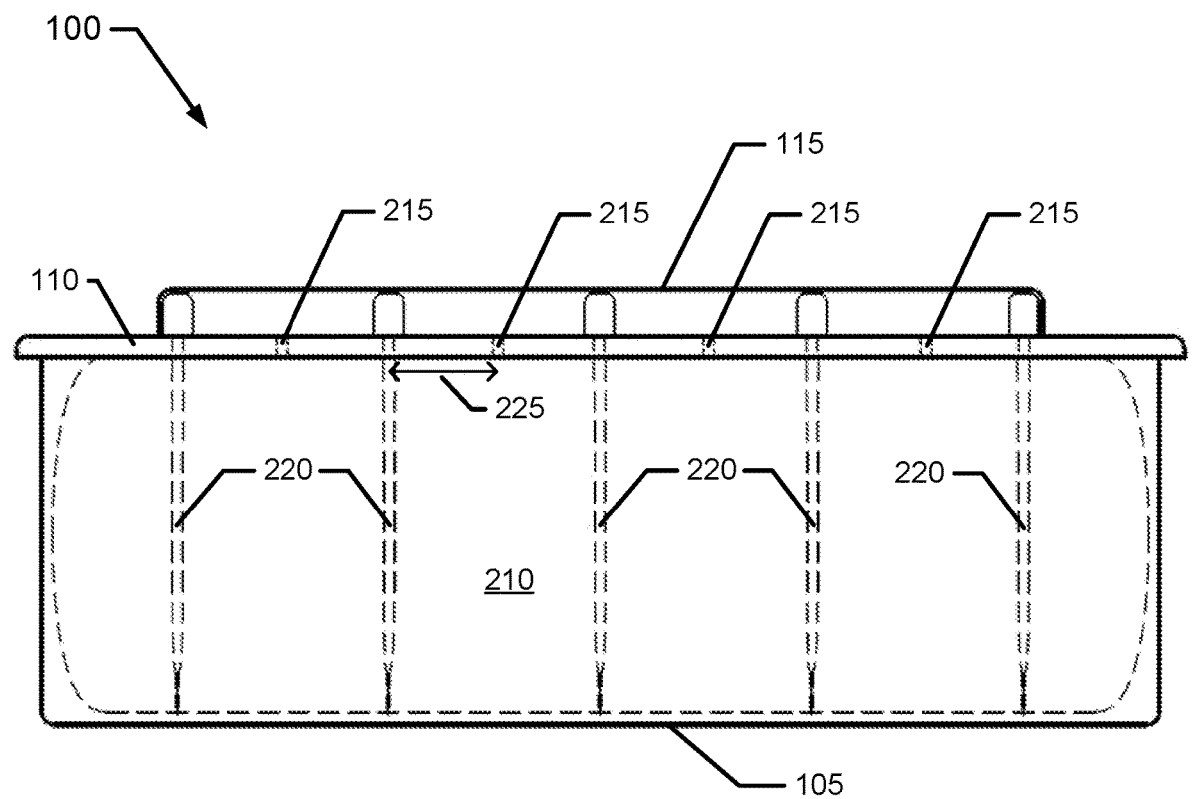
FIG. 3 is a partially transparent side cross-sectional view of the apparatus illustrated in FIG. 1 holding a meat chub, in accordance with some embodiments.

FIG. 3 is a partially transparent side cross-sectional view of the apparatus illustrated in FIG. 1 holding a meat chub, in accordance with some embodiments.

Figure 4:
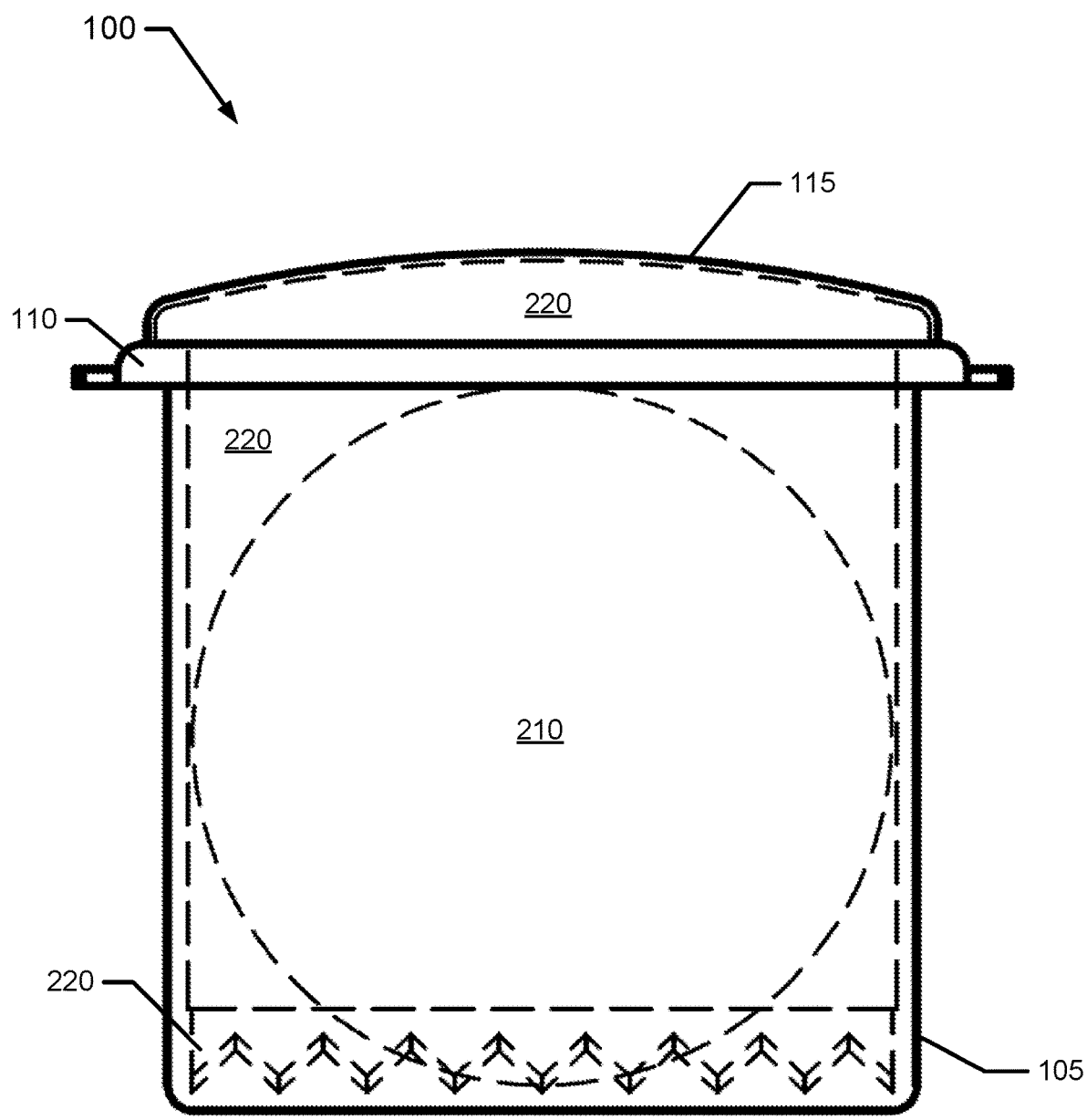
FIG. 4 is a partially transparent end cross-sectional view of the apparatus illustrated in FIG. 1 holding a meat chub, in accordance with some embodiments.

FIG. 4 is a partially transparent end cross-sectional view of the apparatus illustrated in FIG. 1 holding a meat chub, in accordance with some embodiments.

Figure 5:
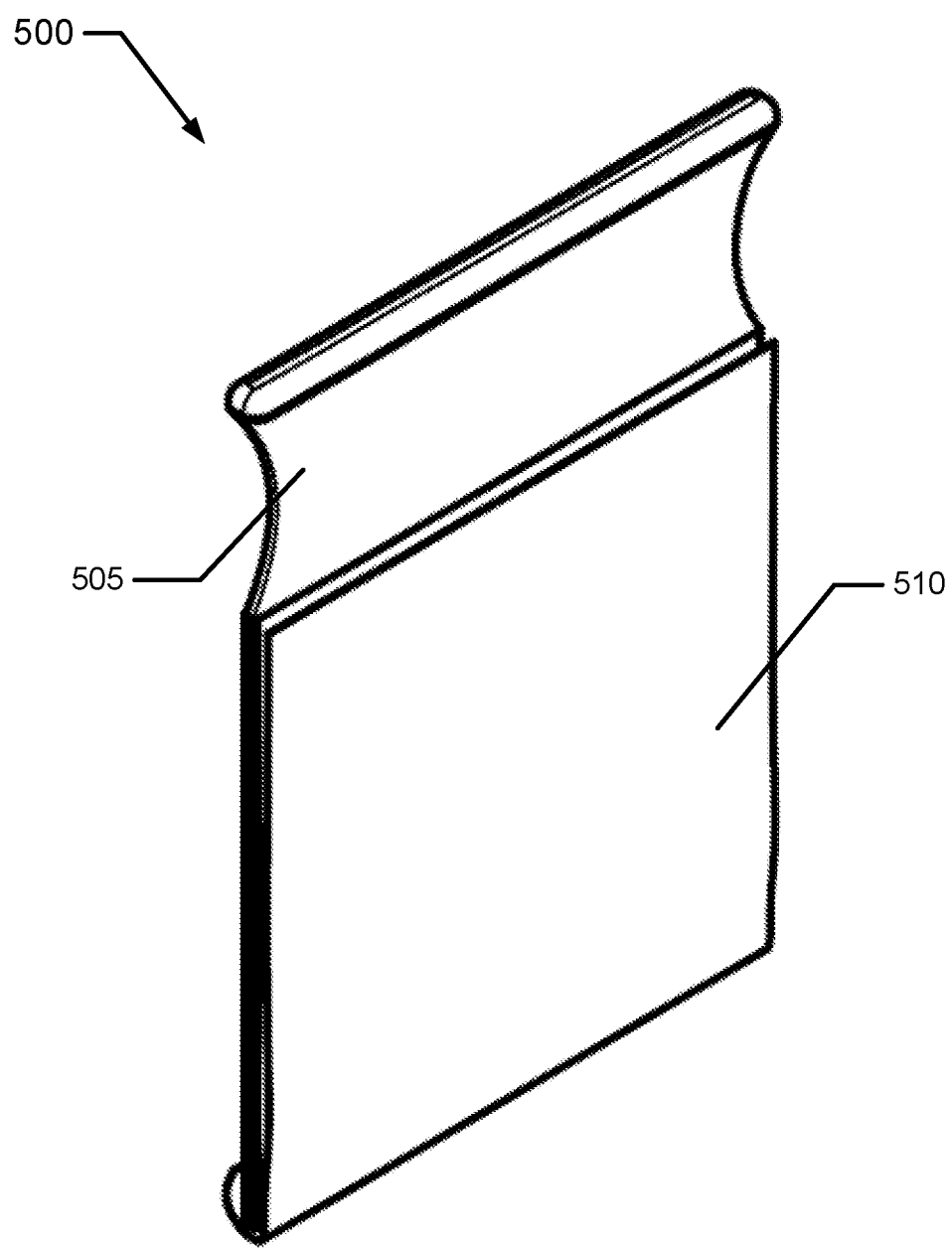
FIG. 5 is a separator insertion tool for use with the apparatus illustrated in FIG. 1, in accordance with some embodiments.

In some embodiments, the apparatus 100 for portioning and storing a meat chub comprises a housing 105 having an opening 205 configured to receive and retain a meat chub 210 within the housing; a lid 110 to hold and seal the meat within the housing, the lid having a plurality of slotted openings 215, wherein the slotted openings are configured to pass a portion of one or more cutters 220 and/or paper insertion members (illustrated in FIG. 5); wherein when the lid is attached to the housing, the one or more cutters are configured to cut through the non-frozen meat chub retained in the housing. The apparatus may further comprise a cover 115 configured to cover and hold the one or more cutters 220 which pass through the plurality of slotted openings and slice through the retained meat chub. In some embodiments, a separating paper such as wax paper, an example of which is illustrated in FIG. 5, may be placed around the cutter, either prior to the initial cutting of the meat chub or after the initial cutting, in order to prevent the sliced portions of the meat chub from freezing back together or to the cutter. In such an embodiment, after the meat chub has been portioned by the one or more cutters, the one or more cutters may be removed to leave the separating paper between the portions of the meat chub. Having the separating paper between the meat portions makes it possible to remove from the housing the desired quantity of meat to be cooked.

In some embodiments, the spacing 225 between adjacent slotted openings is configured such that when cutters are passed through the adjacent slotted openings, the resulting meat portion will have a weight typical of a meat patty, such as ¼ lb., ⅓ lb., or ½ lb. In such an embodiment, lids with spacings configured to result in specific meat patty weights may be interchangeably attached to the housing. The apparatus may comprise a lid for ¼ lb. patties, a lid for ⅓ lb. patties, and/or a lid for ½ lb. patties for a particular sized chub. In the embodiment illustrated in FIG. 2 for example, if the chub comprises a 3 lb. chub, then the spacing between the slotted openings may be configured to result in ten approximately ⅓ lb. patties. In some embodiments, as illustrated in FIG. 3, only a portion of the slotted openings will be used to portion the meat in the chub. Once the meat chub is portioned, the entire apparatus may be placed in the freezer to freeze the meat for later consumption. Since the meat has portioned and stored prior to freezing, it is possible to remove the desired portion of the chub to be cooked.

In some embodiments, each of the openings of the plurality of slotted openings comprises a flexible seal within the opening configured to seal the inner portion of the housing from the exterior when neither a cutter or a paper insertion member is passing through the slotted opening of the lid, while still being able to pass a cutter or a paper insertion member when desired.

In some embodiments, the housing, lid, one or more cutters, and cover of the apparatus are formed of material, such as (but not limited to) metal, plastic, polycarbonate, compounds thereof and the like, all of which are well known in the art for their suitability for holding, storing, and cutting meat. In some embodiments, the housing, lid, and cover of the apparatus are formed of glass material, such as (but not limited to) soda-lime silicate glass and borosilicate glass, compounds thereof and the like, all of which are well known in the art for their suitability for holding food.

FIG. 5 is a separator insertion tool for use with the apparatus illustrated in FIG. 1, in accordance with some embodiments.

In some embodiments, the apparatus further comprises a paper insertion member 505 which may be used to insert a separating paper 510 through a slotted opening and between a previously sliced portion of the meat chub. After the separating paper is inserted, the paper insertion member may be either left in place or removed from the apparatus during freezing. As discussed previously, the cutter may also be used to insert paper between the meat portions. In some embodiments, the paper insertion member is left in the apparatus during freezing of the meat chub.

In some embodiments, the paper insertion member of the apparatus is formed of material, such as (but not limited to) metal, plastic, polycarbonate, compounds thereof and the like, all of which are well known in the art for their suitability for use in food related products.

FIG. 6 is a flowchart illustrating a method for portioning and storing a meat chub using the apparatus illustrated in FIGS. 1-5, in accordance with some embodiments.

According to one embodiment of the present invention, the method for portioning a meat chub begins at block 605, where an apparatus for portioning a meat chub is provided, wherein the apparatus for portioning a meat chub comprises a housing having an opening configured to receive and retain a meat chub within the housing; a lid to hold and seal the meat within the housing, the lid having a plurality of slotted openings, wherein the slotted openings are configured to pass a portion of one or more cutters; wherein when the lid is attached to the housing, the one or more cutters are configured to cut through the non-frozen meat chub retained in the housing. The apparatus may further comprise a cover configured to cover and hold the one or more cutters which pass through the plurality of slotted openings and slice through the retained meat chub. Next, at block 610, with the lid removed from the housing, a non-frozen meat chub is passed through the opening and placed into the housing. At block 615, the lid is attached to the housing. Next, at block 620, one or more cutters are passed through the plurality of slotted openings to slice the meat chub into desired portions. In some embodiments, a separating paper such as wax paper may be placed around the cutter, either prior to the initial cutting of the meat chub or after the initial cutting, in order to prevent the sliced portions of the meat chub from freezing back together or to the cutter. If paper is inserted, the cutter may be removed from the apparatus prior to the placement of the apparatus into the freezer. In an alternate embodiment, a cutter is used to slice through the chub and a paper insertion member is used to insert a separating paper through the slotted openings and between a previously sliced portion of the meat chub. In some embodiments, one or more paper insertion members are left in the apparatus during freezing of the meat chub. Next at block 625, the apparatus is removed from the freezer when a portion or all of the meat chub is to be cooked. Since the meat chub was portioned prior to freezing, it is possible to remove only a portion of the meat chub for cooking.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. An apparatus for portioning and storing a meat chub, the apparatus comprising:
   a housing having an opening;
   a lid removably coupled to the opening of the housing, the lid comprising a plurality of slotted openings, which are parallel and spaced evenly one to another; and
   one or more cutters removably insertable through the plurality of slotted openings;
   wherein the number of the plurality of slotted openings is greater than the number of the one or more cutters;
   wherein the housing is configured to receive a meat chub through the opening of the housing and retain the meat chub within the housing,
   wherein the lid is configured to secure the meat within the housing when the lid is coupled to the housing, and
   wherein when the lid is coupled to the housing, the one or more cutters are configured to pass through the plurality of slotted openings to cut through the meat chub retained in the housing.

2. The apparatus of claim 1, further comprising a cover, the cover configured to cover and hold the one or more cutters which pass through the plurality of slotted openings and cut through the retained meat chub.

3. The apparatus of claim 1, wherein each of the one or more cutters comprises a serrated edge.

4. A method for portioning and storing a meat chub, comprising:
   providing an apparatus comprising:
      a housing having an opening;
      a lid removably coupled to the opening of the housing, the lid comprising a plurality of slotted openings, which are parallel and spaced evenly one to another; and one or more cutters removably insertable through the plurality of slotted openings; wherein the number of the plurality of slotted openings is greater than the number of the one or more cutters; wherein the housing is configured to receive a meat chub through the opening of the housing and retain the meat chub within the housing, wherein the lid is configured to secure the meat within the housing when the lid is coupled to the housing, and wherein when the lid is coupled to the housing, the one or more cutters are configured to pass through the plurality of slotted openings to cut through the meat chub retained in the housing;
   removing the lid from the housing,
   inserting the meat chub through the opening of the housing;
   attaching the lid to the housing; and
   passing the one or more cutters through the plurality of slotted openings to slice the meat chub into portions.

5. The method of claim 4, wherein the apparatus further comprises a cover, the cover configured to cover and hold the one or more cutters which pass through the plurality of slotted openings and cut through the retained meat chub.

6. The method of claim 4, wherein each of the one or more cutters comprises a serrated edge.

* * * * *